United States Patent Office 2,743,262
Patented Apr. 24, 1956

2,743,262
A-(CHLOROACETAMIDO)-ACRYLIC ESTERS AND THEIR HOMO- AND CO-POLYMERS

Harry W. Coover, Jr., and Newton H. Shearer, Jr., Kingsport, Tenn., assignors to Eastman Kodak Company, Rochester, N. Y., a corporation of New Jersey No Drawing. Application July 11, 1952,
Serial No. 298,458

14 Claims. (Cl. 260—85.5)

This invention relates to new and valuable esters of a-(chloroacetamido)-acrylic acid and their homopolymers and copolymers. The monomers have the formula:

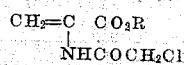

where R is an alkyl group such as methyl, ethyl, propyl, isopropyl, etc.

The homopolymers and copolymers of the invention possess outstanding valuable properties to an unexpected degree, particularly in their unusually high softening points.

We have found that the a-(chloroacetamido)-acrylic esters can be readily prepared by treating the silver salt of a-(chloroacetamido)-acrylic acid with an alkyl iodide or by saturating an alcoholic solution of a-(chloroacetamido)-acrylic acid with dry hydrogen chloride. The esters are purified by distillation under reduced pressure.

a-(Chloroacetamido)-acrylic acid is obtained from the reaction of pyruvic acid and chloroacetamide as shown by Bergmann and Grafe (Z. Physiol. Chem. 187, 187 (1930)). The other product of this reaction, a,a-bis-(chloroacetamido)-propionic acid can be heated in acetic acid solution to split out one molecule of chloroacetamide and form more of the a-(chloroacetamido)-acrylic acid.

The a-(chloroacetamido)-acrylates readily homopolymerize and copolymerize to give new and valuable polymers which can be used, for example, as molding materials or fibers. The usual catalyst or "initiating" agents such as hydrogen peroxide, benzoyl peroxide, potassium persulfate, Porophor-N, and so forth are used and certain "activating" agents such as sodium bisulfite may be used with the usual catalysts.

As an example of the valuable properties imparted to polymers, a 20 percent by weight copolymer of methyl a-(chloroacetamido)-acrylate with acrylonitrile has a softening point above 180° C. and can be spun into fibers which have excellent dyeing properties.

It is an object of our invention to provide new compounds comprising the a-(chloroacetamido)-acrylic acid esters. A further object resides in the provision of homopolymers and copolymers of a-(chloroacetamido)-acrylic acid esters. Another object resides in the provision of a method of preparing these esters.

The following examples will illustrate the invention, but they are to be considered in an illustrative and not a limiting sense.

PREPARATION OF THE MONOMERS

Example 1.—Methyl a-(chloroacetamido)-acrylate

To 16.4 g. of a-chloroacetamidoacrylic acid was added with stirring and cooling a solution of 4.0 g. of sodium hydroxide in 25 ml. of water; followed by a solution of 17.0 g. of silver nitrate in 150 ml. of water. The silver salt thus formed was separated by filtration, washed twice with cold water, then twice with acetone. The dry, powdered silver salt was added with stirring to 100 g. of methyl iodide containing 0.1 g. of hydroquinone. The exothermic reaction caused warming of the methyl iodide to reflux. The mixture was stirred for one half hour at room temperature; then filtered. The filtrate was distilled through a short unpacked column. The methyl a-(chloroacetamido)-acrylate was collected at 67–69° C./0.08 mm. and solidified upon cooling in the receiver.

Example 2.—Ethyl a-(chloroacetamido)-acrylate

Dry hydrogen chloride was admitted with stirring into a chilled suspension of 10 g. of a-chloroacetamidoacrylic acid in 100 cc. of absolute ethanol. Stirring and cooling were continued for one hour after the mixture became saturated with hydrogen chloride. The solid dissolved. After removal of a portion of the ethanol and hydrogen chloride under reduced pressure, sodium ethoxide was added to bring the pH of the mixture up to 6. Sodium chloride was removed by filtration. Hydroquinone, 0.05 g., was added to the filtrate and the product was collected by distillation, at 78–80° C./0.1 mm.

Example 3.—Isopropyl a-(chloroacetamido)-acrylate

The isopropyl ester was prepared using dry hydrogen chloride with a suspension of a-chloroacetamidoacrylic acid in isopropanol and following the procedure of Example 2. The product was collected at 84–86° C./0.1 mm.

HOMOPOLYMERIZATION

Example 4

Five grams of methyl a-(chloroacetamido)-acrylate was polymerized at 60° C. in a nitrogen atmosphere using 0.1 percent acetyl peroxide as a catalyst. The product is a clear, hard, moldable polymer.

Example 5

Four grams of ethyl a-(chloroacetamido)-acrylate was polymerized at 60° C. in a nitrogen atmosphere using 0.1 percent acetyl peroxide as a catalyst. A clear, hard, moldable polymer formed.

Example 6

Three grams of isopropyl a-(chloroacetamido)-acrylate was polymerized at 55° C. in a nitrogen atmosphere using 0.1 percent benzoyl peroxide as a catalyst. A clear, hard, moldable polymer formed.

COPOLYMERIZATION

Example 7

Eight grams of methyl a-(chloroacetamido)-acrylate and two grams of methyl methacrylate were copolymerized at 60° C. using 0.1 percent benzoyl peroxide as a catalyst to form a clear, hard, moldable polymer.

Example 8

Two grams of methyl a-(chloroacetamido)-acrylate and eight grams of methyl methacrylate were copolymerized at 60° C. using 0.1 percent acetyl peroxide catalyst. The product is a clear, hard, moldable polymer.

Example 9

Eight grams of styrene and two grams of ethyl a-(chloroacetamido)-acrylate were copolymerized at 60° C. using 0.1 percent acetyl peroxide as a catalyst to form a clear, hard, moldable polymer.

Example 10

Six grams of vinyl acetate and one gram of isopropyl a-(chloroacetamido)-acrylate were copolymerized at 60° C. using 1.0 percent benzoyl peroxide as a catalyst. A clear, hard, moldable polymer was obtained.

Example 11

Five grams of acrylonitrile, 1.0 g. of methyl a-(chloroacetamido)-acrylate, 0.055 g. of ammonium persulfate and 0.1 g. of sodium bisulfite were placed in 45 cc. of distilled water. The polymerization began immediately and was complete after several hours at 50° C. The white polymer was filtered, washed and dried. The polymer is soluble in dimethyl formamide and dimethyl acetamide.

Example 12

Two grams of methyl a-(chloroacetamido)-acrylate, 7 g. of vinyl chloride, 1 g. of soap, 0.05 g. of ammonium persulfate and 0.1 g. of ammonium bisulfite were added to 35 cc. of distilled water in a pressure bottle. After 24 hours at 60° C. acetic acid was added and the white polymer was filtered, washed and dried to obtain a moldable product.

The examples given above provide polymers and copolymers which quite unexpectedly have high melting points and good dyeability. This is particularly true of the copolymer of Example 11.

We claim:
1. Compounds of the structure

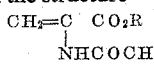

where R is an alkyl group of 1–3 carbon atoms.
2. Methyl a-chloroacetamidoacrylate.
3. Ethyl a-chloroacetamidoacrylate.
4. Isopropyl a-chloroacetamidoacrylate.
5. Homopolymers of the compounds of claim 1.
6. Homopolymeric methyl a-chloroacetamidoacrylate.
7. Homopolymeric ethyl a-chloroacetamidoacrylate.
8. Homopolymeric isopropyl a-chloroacetamidoacrylate.
9. Copolymers of the compounds of claim 1 with a compound selected from the group consisting of methyl methacrylate, styrene, vinyl acetate, acrylonitrile and vinyl chloride.
10. Copolymers of the compounds of claim 1 with methacrylate.
11. Copolymers of the compounds of claim 1 with styrene.
12. Copolymers of the compounds of claim 1 with vinyl acetate.
13. Copolymers of the compounds of claim 1 with acrylonitrile.
14. Copolymers of the compounds of claim 1 with vinyl chloride.

References Cited in the file of this patent

UNITED STATES PATENTS

| | | |
|---|---|---|
| 2,548,518 | Coover et al. | Apr. 10, 1951 |
| 2,588,969 | Dickey et al. | Mar. 11, 1952 |

OTHER REFERENCES

Bergmann et al.: "Z. Physiol. Chem." (1930), vol. 24, pp. 2150–51.

Groggins: "Unit Process in Org. Synthesis" (1947), 3rd edition, pages 613–642.